June 12, 1923.
R. H. ANDERSON
1,458,675
APPARATUS FOR FORMING STRIPS OF ASBESTOS CEMENT MATERIAL
Filed July 6, 1921
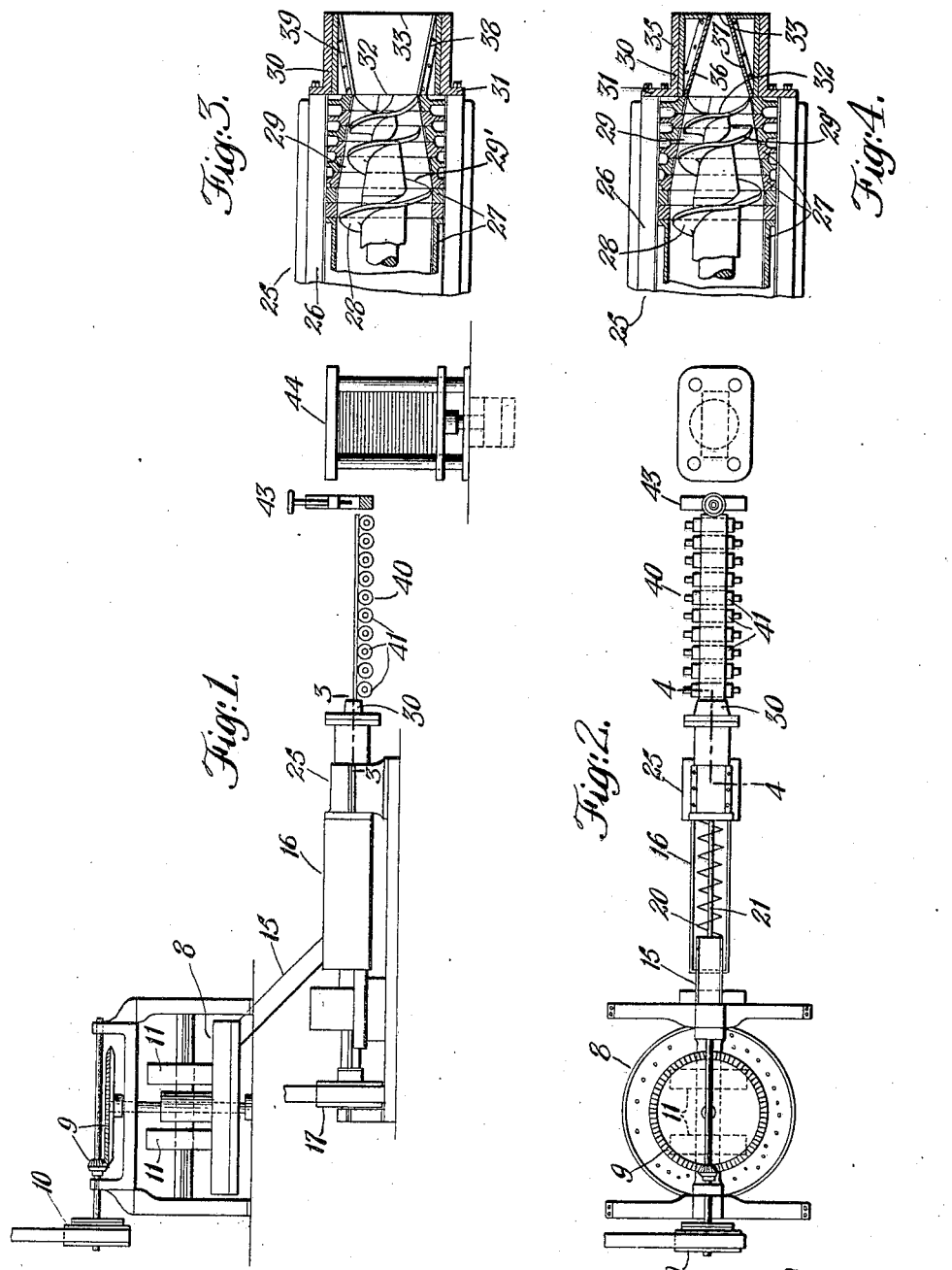
Inventor
Robert H. Anderson
By his Attorneys
Edwards, Sager & Bower

Patented June 12, 1923.

1,458,675

UNITED STATES PATENT OFFICE.

ROBERT H. ANDERSON, OF AMBLER, PENNSYLVANIA, ASSIGNOR TO ASBESTOS SHINGLE, SLATE & SHEATING COMPANY, A CORPORATION OF PENNSYLVANIA.

APPARATUS FOR FORMING STRIPS OF ASBESTOS-CEMENT MATERIAL.

Application filed July 6, 1921. Serial No. 482,692.

*To all whom it may concern:*

Be it known that I, ROBERT H. ANDERSON, a citizen of the United States, residing at Ambler, in the county of Montgomery and State of Pennsylvania, have invented certain new and useful Improvements in Apparatus for Forming Strips of Asbestos-Cement Material, of which the following is a specification.

This invention relates to apparatus for producing slabs, shingles, blocks, etc., of asbestos cement composition and particularly to apparatus in which the asbestos cement material is mixed together in a wet plastic mass and pressed out in slab form through a die. The object of the invention is to provide apparatus which will be simple and inexpensive and which will form the material into desired shape with firm, homogeneous composition throughout.

Further objects of the invention particularly in the formation of the die surfaces will appear from the following description taken in connection with the accompanying drawings in which, Figs. 1 and 2 are elevational and plan views of apparatus embodying the invention, and Figs. 3 and 4 are enlarged sectional views on lines 3—3 and 4—4 of Figs. 1 and 2 respectively.

In the specific embodiment of the invention shown in the drawings dry asbestos material is placed in the dry pan 8 the bottom of which is rotated by bevel gears 9 from pulley 10 so as to pulverize the material under the mulling rolls 11. The asbestos material may be asbestos waste, a fine powdery substance, mixed with very short asbestos fibers. To this is added cement in desired proportions, the cement being for instance a third to a half of the total dry mixture by weight, and the whole is thoroughly stirred and mixed in the dry pan 8 with 20% of water. After the mixture is thoroughly saturated with the water, oil is added and worked into the wet mass. The oil used is preferably a heavy mineral, non-saponifiable oil such as Pennsylvania crude or lubricating oil and in amount will most advantageously be about five per cent of the weight of the cement.

The oiled mixture is then passed down chute 15 to the mixer or pug mill 16 driven by pulley 17. In this mill the material is thoroughly stirred as it is fed from left to right the conveying means being stirring arms 20 arranged in a helical series on rotary shaft 21. The mixture thus worked takes on clayey properties causing the particles to adhere together in a tenacious plastic mass which is discharged by the pug mill 16 into the auger mill 25.

The auger mill 25 (see Figs. 3 and 4) comprises an outer frame 26 with liners 27 and an internal helical screw blade 28. The liners 27 provide a cylindrical chamber having a tapered portion 29 at its discharge end the auger screw 28 being correspondingly tapered as shown at 29'. The plastic mass received from the pug mill 16 is fed forward by the auger mill and discharged under pressure into the die 30 attached to the end of the auger machine by flange 31.

The die 30 has an entrance orifice 32 corresponding to the discharge opening of auger machine, and at its other end the die has the slab or block forming orifice 33 corresponding to the desired sectional shape of the final product. Between the entrance and outlet the internal die surface merge smoothly to gradually form the moving plastic mass into desired shape. In the specific example shown in the drawings the apparatus is adapted for the formation of flat slabs or shingles and the die frame 35 carries upper and lower guides 36, 37 inclined toward the center and spaced apart at the die orifice 33 a distance corresponding to the desired thickness of the plastic slab. Fitted between these guides 36, 37 are the side strips 38, 39 starting from the orifice 32 and spreading apart toward the die orifice 33 to give the desired width to the product. Thus as the upper and lower surfaces tend to compress the material vertically the side strips permit it to expand somewhat horizontally and the change of shape of the plastic mass begins at the entrance orifice 32 and gradually progresses to completion at the discharge orifice 33. All abrupt deflection and scraping of the mixture is avoided and it is evenly and progressively shaped into desired form with gradual relative shifting of its parts. The result is that the tenacious clayey texture of the material is preserved without weakening or cracking and a smooth homogeneous sheet flows from the die orifice.

In order to maintain this sheet continuous and of the same thickness and consistency it is highly desirable to maintain a constant and regular flow of material and the pug mill must be kept full. Any discontinuity in the supply is apt to vary the flow at the die orifice so as to thin out or misform the issuing sheet.

The plastic sheet leaving the die 30 is received by a feed table 40 comprising rollers 41 closely spaced and lightly rotating in ball bearings so as to be easily turned by the thrust of the material from the die. At the discharge from the table 40 the sheet is cut into desired length by cutter 43 and the cut slabs with steel sheets between them are piled in hydraulic press 44 and subjected to high pressure to compact the material and squeeze out excess water and the sheets are then removed and permitted to set.

In the apparatus of this invention the cement and asbestos are thoroughly mixed with the water and oil and then pressed out into final sheet form. Once the die shaping operation begins on the plastic clayey mass it directly forms the sheet on smooth and even flow lines so that the sheet elements are gradually drawn together in final form in compact homogeneous manner. It then simply remains to cut the sheet into slabs of desired length and press and age them for the market.

I claim:—

In apparatus for forming asbestos-cement slabs and the like the combination with an auger machine adapted to feed a plastic mixture of asbestos and cement, of a die having its entrance orifice matching vertically and horizontally the outlet from said auger machine and having a pair of guiding surfaces contracting the die passage in the direction of flow and a second pair of guiding surfaces diverging in the direction of flow, said four guiding surfaces at the discharge forming a relatively narrow orifice shaping the asbestos cement material into a flat ribbon.

ROBERT H. ANDERSON.